United States Patent [19]

Suter et al.

[11] 4,456,496

[45] Jun. 26, 1984

[54] METHOD OF MAKING AN ELASTOMERIC FABRIC CONTAINER

[75] Inventors: Charles A. Suter, Stow; Raymond J. Namsick, Akron, both of Ohio

[73] Assignee: Goodyear Aerospace Corporation, Akron, Ohio

[21] Appl. No.: 16,588

[22] Filed: Mar. 1, 1979

Related U.S. Application Data

[63] Continuation of Ser. No. 618,980, Oct. 2, 1975, abandoned.

[51] Int. Cl.$^3$ .............................................. B32B 31/00
[52] U.S. Cl. ........................................ 156/249; 150/5 S; 156/90; 156/217; 156/246; 156/264; 156/266; 156/306.9; 156/315; 156/331.2; 156/335; 428/267; 428/287; 428/290; 428/912

[58] Field of Search .................. 156/90, 264, 217, 266, 156/218, 309, 246, 315, 249, 331, 256, 335; 427/390 R, 412; 260/845; 428/260, 483, 262, 506, 265, 520, 267, 521, 287, 522, 290, 524, 912, 475.2; 150/0.5

[56] References Cited

U.S. PATENT DOCUMENTS

| | | | |
|---|---|---|---|
| 2,394,375 | 2/1946 | Cross | 260/845 |
| 2,406,903 | 9/1946 | Rethorst | 156/309 |
| 2,586,587 | 2/1952 | Wendt | 260/845 |
| 2,973,293 | 2/1961 | Schofield | 428/475.2 |
| 3,542,717 | 11/1970 | Lipman | 428/441 |

*Primary Examiner*—John J. Gallagher
*Attorney, Agent, or Firm*—P. E. Milliken; L. A. Germain; J. D. Wolfe

[57] ABSTRACT

A method of making an elastomeric coated fabric container utilizing cured elastomeric coated fabric and adhering the edges of each layer of fabric to the other with an adhesive film and curing the adhesive film under heat and pressure to form said container.

4 Claims, No Drawings

METHOD OF MAKING AN ELASTOMERIC FABRIC CONTAINER

This is a continuation, of application Ser. No. 618,980 filed Oct. 2, 1975, now abandoned.

This invention relates to a method of making elastomeric coated fabric containers.

Certain elastomeric coated fabric containers are made from elastomers having thermoplastic characteristics. In making these containers, fabric is coated with the thermoplastic elastomer and then panels of the coated fabric are seamed together by use of sufficient heat and pressure to fuse the thermoplastic elastomer in the seam. Tanks made in this manner, though useful in many applications, cannot be made in sizes and configurations where high loads are placed on the seams, since the thermoplastic elastomers are not suitable for continuous high load service due to the inherent tendency of thermoplastic materials to creep under high stress. Furthermore, the number of thermoplastic elastomers is limited. Thermoplastic polyurethane is the principal material in this category, but it suffers from lack of resistance to hydrolysis and lack of resistance to acids which can be formed from the sulfur present in hydrocarbon fuels.

An alternate method of making elastomeric coated fabric containers has been to coat fabric with unvulcanized elastomeric material and seam panels of the uncured elastomeric coated fabric together with solvent adhesives consisting of a solution of uncured elastomer in appropriate solvent, and then curing the container in an autoclave at elevated pressure and temperature. This process produces high quality tanks from elastomers such as nitrile rubber which are not thermoplastic in nature and cannot be seamed by heat sealing. The process suffers from several deficiencies. The use of this method requires the autoclave or curing chamber to be of sufficient size to hold the finished container. This in actual practice limits the size of the tanks produced to approximately 50,000 gallon capacity.

The use of solvent cements is undesirable since solvent fumes are released which may be restricted by the United States Environmental Protection Agency or the United States Department of Labor regulations. The use of inflammable solvents is also undesirable since the resultant fire hazzard requires nonflammable buildings, spark-proof electrical switches and forced draft ventilation.

A further deficiency of this process is that the fabricated tank must be moved in the uncured state from the building area and rolled on a drum or otherwise positioned to fit in the autoclave. This handling of a large item of soft and uncured rubber often results in damage to the tank.

This invention provides a method of making a fuel tank which eliminates the need to cure the finished container and also reduces some of the steps in the preparation of the container.

In accordance with this invention a suitable fabric such as a polyester or nylon is coated with a suitable elastomeric material such as acrylonitrile-butadiene rubber, either by spread coating a cement or dough onto the fabric and then calendering or otherwise bringing the amount of elastomer onto the fabric to the desired thickness. The elastomer thereon is cured in a suitable press or autoclave to give the fabric containing the cured elastomeric coating thereon. This fabric is then cut into pieces which are seamed together with a suitable bonding film and the ply edges are subjected to suitable temperature and pressure conditions to bring about lamination of the plies to each other and thereby adhere the plies together to give the finished container. Although any of the elastomeric materials may be utilized for making elastomeric fabric containers, it is preferred to utilize nitrile rubbers where the container is to be utilized for holding gasoline or hydrocarbon fuels.

Although bonding films of various types may be used for making the seams of said containers, it is preferred that bonding films made of nitrile rubber and phenolic resins be used to make the seams between the pieces of nitrile rubber coated fabric.

The nitrile rubbers useful in this invention are well known and the preferred grades are frequently referred to in the trade as medium to low level acrylonitrile-butadiene copolymers with the acrylonitrile level in the copolymer being about 10 to 50 percent by weight and the preferred range being 15 to 40 percent.

The nature of these phenolic resins is discussed in regard to production and use in David F. Gould's book, Phenolic Resins, copyrighted in 1959 by Reinhold Publishing Corporation, with the preferred aldehydes being formaldehyde and furfural and the phenols being phenol, resorcinol, and the alkylated phenols having alkyl radicals of 1 to 12 carbon atoms. The preferred alkyl radicals are tertiary butyl and tertiary amyl. Generally the preferred phenolaldehyde resins are those soluble in acetone and methyl ethyl ketone as they can be more readily and easily incorporated in the nitrile rubber as their ketone solution rather than adding them as a powder where they are not ketone soluble.

The barrier compositions useful in this invention are the polyamide of the type and grade well known for fuel cell barriers such as Nylon 6—6. Normally the nylon is dissolved or dispersed in ethanol, propanol or mixtures to permit the dispersion to be painted on by spraying, brushing, rolling or other known techniques. The nylon dispersion preferably contains 35 to 10 percent, based on the weight of nylon, or any of the epoxy resin and catalyst of the well known epoxy resin-curative type such as the carboxylic acids, amines and amides. Of the many useful varieties of epoxy resins useful in this invention, the bis phenol A epoxy resins and the epoxy resins of the olefins and polymers of olefins each having from 2 to 20 carbon atoms are most readily available and usable. A few of the many well known epoxy catalysts are enumerated to illustrate some preferred species: any of the organic monoamines, organic diamines, triamines and tertiary amines where organic radicals are alkyl, aryl, and cycloalkyl and mixtures of those having one to about 20 carbon atoms, the organic acids of aliphatic, aromatic and cycloaliphatic classes where the acid is monocarboxylic or polycarboxylic of about one to 20 carbon atoms and the amides and polyamides of these acids.

The following illustrative example is set forth to further exemplify the objects and advantages of this invention. The parts and percentages are by weight unless otherwise indicated.

EXAMPLE I

A fuel storage container known in the trade as the "Pillow Tank" was prepared by compounding butadiene-acrylonitrile rubber according to the recipe, as follows:

| Compound A: | Parts |
|---|---|
| Butadiene-acrylonitrile copolymer | 100 |
| Zinc oxide | 5 |
| Sulfur | 1.5 |
| Magnesium carbonate | 2.25 |
| Carbon black (fine thermal furnace and HAF) | 112 |
| Dioctyl phthalate | 17 |
| Aryl-p-phenylene diamines | 0.5 |
| Polyvinyl chloride resin | 43 |
| Adipic acid ester plasticizer [1] | 35 |
| Accelerator mixture of a benzothiazole sulfonamide and a benzothiazole disulfide | 1.75 |
| Total | 318.0 |

[1] - Obtained as Adipal BCA from The F.M.C. Corporation.

This compounded butadiene-acrylonitrile rubber copolymer was then applied to sheets of nylon fabric of eight ounces per square yard weight by calendering on the compounded rubber recipe to give a coating of 60 mils on the nylon sheet. The sheet as it came from the calender was rolled up on a roll with a protective barrier between the layers and placed in an autoclave and cured at about 310° F. for approximately one-half hour. The sheets from the curing oven were unrolled and cut into the appropriate length for building a Pillow Tank. These sheets were spread on the floor and seamed together by an adhesive film placed between the sheets of cured elastomeric fabric and the overlapped area while these sheets were positioned within a press. The press was closed and the adhesive film cured at approximately 130 pounds pressure and 170° C. for about 30 minutes. As each sheet of cured rubberized nylon was seamed together with another one and cured, this process was continued until the complete container was fabricated. Thus a container was obtained which could be filled with fuel and passed all the stand tests and other tests required for rubberized fabric containers of this type.

The above bonding film was prepared as follows: An adhesive with the following composition:

| | |
|---|---|
| Butadiene-acrylonitrile copolymer | 72 |
| Zinc oxide | 3.5 |
| Sulfur | 1 |
| Carbon black (SRF) | 21 |
| Accelerator (a benzothiazole disulfide) | 0.5 |
| Phenolic resin | 83.5 |
| Methyl ethyl ketone | 548 |
| Total | 730.5 | was applied in sufficient amount to a polyethylene release sheet so as to give a dried film thickness of 0.05 inch. The film was cut into strips 2 inches wide, which were used to make seams by putting the film between two pieces of a previously cured nitrile rubber coated fabric, heating to 200° C. for 10 minutes under 250 p.s.i., and cooling to 93° C. while maintaining the pressure to laminate the fabric strips together.

These laminated strips were subjected to shear test on strips 2 inches wide having a 2 inch overlapped seam. The laminated strips had a shear tear of at least 790 pounds on a two-inch strip and the failure was in the fabric. These test values indicate that this adhesive is satisfactory for making the fuel containers of this invention.

The thickness of the adhesive film on release sheet, film or paper should be at least 0.02 inches to 0.3 inches with the preferred thickness being 0.03 to 0.1 inch. The width of the film usually will be 0.5 to 3 inches but width is usually a matter of choice, depending on the service to which it is to be subjected.

Where the polyethylene film is used to hold the adhesive, there usually is no need to use a release agent, but with materials such as paper, the silicone and related release agents may be used to give the support or substrate release characteristics to permit the adhesive film to be forced into contact with the rubberized fabric, and then the release substrate is removed to leave or expose the other side of the adhesive film positioned on the rubberized fabric.

In general, the adhesives of this invention contain about 5 to 80 percent phenolic resin and 95 to 20 percent rubber, with the preferred range being 33 to 66 percent rubber and 66 to 33 percent resin.

While certain representative embodiments and details have been shown for the purpose of illustrating the invention, it will be apparent to those skilled in the art that various changes and modifications may be made therein without departing from the spirit or scope of the invention.

What is claimed is:

1. A method of making an elastomer coated fabric container comprising coating a fabric with a curable elastomer, curing the curable elastomer coating on the fabric, cutting a panel from said elastomer coated fabric either before or after the curing step, assembling said panels of cured elastomer coated fabric into a container by placing each edge of the panel in overlapping relationship with another edge, positioning a preformed strip or film of an adhesive composed of an elastomer and a thermosetting resin between the edges in overlapping relationship and pressing said edges under pressure for at least two minutes at a temperature and pressure sufficient to cause a bond to form between each panel.

2. The method of claim 1 wherein the adhesive is a blend of a butadiene acrylonitrile rubber and a phenolic resin.

3. The method of claim 2 wherein the adhesive contains 5 to 80 percent resin and 95 to 20 percent rubber.

4. The method of claim 1 wherein the adhesive film is applied while supported on a releasable substrate and the substrate is removed to expose the adhesive film.

* * * * *